3,073,702
WATER DISPERSIBLE COLLAGEN
Havard L. Keil, Clarendon Hills, and Edward F. Cavanaugh, Wilmette, Ill., assignors, by mesne assignments, to Armour and Company, Chicago, Ill., a corporation of Delaware
No Drawing. Filed Feb. 4, 1960, Ser. No. 6,640
8 Claims. (Cl. 99—169)

This invention relates to water dispersible collagen. More particularly it relates to a new and useful water dispersible collagen product having controlled viscosity, and a method for preparing the same.

Collagen is a white connective tissue found chiefly in animal structures requiring strength: skin, bones, intestines, teeth, tendons, recticular tissue and the like. It is the parent protein from which glue and gelatin is evolved.

Native collagen is insoluble and generally indispersible in water. Gelatin and glue, evolved and extracted from collagenous material, are water soluble. For many purposes collagen is more useful than gelatin. Collagenous pastes may be incorporated in foods as heat coagulable binders. Gelatin is of course not heat coagulable. Liquified water dispersions of collagen form films usable as food coatings which have moisture barrier and mold inhibition properties superior to those of gelatin films. Collagenous films air dry faster and form tougher, less brittle coatings than those of gelatin. Collagen films are smooth and non-tacky to the touch. Gelatin films tend to be more sticky than those of collagen. Gelatin films swell and soften on contact with water because of their solubility. Heat-coagulated and dried collagen films are substantially unaffected by water.

Despite its useful properties of providing heat coagulable protein products and high quality films, collagen presents two difficult processing problems. First, water dispersions of native collagen are, practically speaking, impossible to prepare. Mechanical chopping, comminuting, of collagen fibers is not a satisfactory method of preparing collagen which may be dispersed in water. It is first necessary to chemically modify or condition the collagen-bearing material to a desired degree. Lime conditioning of hides and skins, as practiced by the gelatin and glue trade, renders collagen more susceptible to water dispersion. However, traditional conditioning by lime requires about 1 to 4 months. After lime treatment the hide must be washed to remove unbound lime requiring 48 hrs. It is then neutralized with $H_2SO_3$ and again washed for 24 hrs. to remove $CaSO_3$. The first glue extration is made at 50°–60° C. for 4 hrs. to give a water soluble product. Secondly, water dispersions of collagen are exceedingly viscous. Animal skins and hides after processing and comminuting yield pastes of about 19% total solids. When dispersed in water, collagen must be diluted to about 2% total solids before the dispersion becomes liquid.

For some uses high viscosity preparations of collagen are completely satisfactory. Pastes used as heat coagulable food binders may be quite thick without affecting their usefulness. However for other uses high viscosity dispersions are unacceptable. Dispersions into which foods are dipped (dip-coatings) must be liquid to perform satisfactorily under commercial conditions. Dip-coatings composed of viscous collagen and having only 2% solids do not possess the property of quick gelatin at room temperature. Several hours of air drying are necessary to allow a low solids film to gel and dry sufficiently to permit further redippings. Redippings are required to form a coating of adequate thickness. The expense of repeated dippings followed by long drying periods make availability of high solid liquid preparations which gel rapidly economically imperative.

In addition, fatty and oily food surfaces present special problems regarding packaging. Many film forming materials having excellent water barrier properties are adversely affected by contact with fats and oils. Also, the use of many plastic films most suitable for such purposes is prohibited. Toxicity considerations do not permit many excellent plastic products to be brought into contact with foods. By first applying a film of edible collagen, thereby sealing in fats and oils on food surfaces so they cause no further difficulty, it is possible to utilize all types of plastic films. The easily strippable collagen inter-film serves to separate the outer plastic film from the food product contained therein.

Secondly, many plastic dip-coatings dry to a tacky surface thus making the use of them nonfeasible. However an outer coating of collagen over such plastic coatings serves to produce a non-tacky plastic coat, thereby making them available for practical use.

Dip-coatings are highly desirable for packaging of foods because the degree of air exclusion is greater than that possible with any other flexible type of packaging. In addition dip-coating films cooperate with the product contained therein to form packages having great strength.

It is the principle object of this invention to provide collagen which is readily dispersible in water.

It is the second object of our invention to provide a method of rapidly conditioning collagenous material to thereby render it water dispersible, without the danger of forming gelatin or glue.

Another object is to provide a method of reducing the viscosity of collagenous water dispersions to produce preparations having high total solids which are liquid at temperatures around 37° C. and gels at about 25° C.

In the process of this invention collagenous material is contacted with hydrogen peroxide. After this conditioning the collagen is acidified to pH 3.0 or below. The acidified and/or heat treatment may be applied, if desired, to reduce viscosity of comminuted collagen.

Any practical source of collagen such as skin, hides, ossein, and the like may be processed to yield the product to this invention. However, we prefer to use pigskins.

The first step of the process involves contacting of collagen stock with hydrogen peroxide. Hydrogen peroxide treatment modifies the collagen so as to make it dispersible in water. Preferably a solution having a concentration of about 0.6% hydrogen peroxide is employed. The skins are covered with warm water, at a temperature of about 37° C., which contains hydrogen peroxide. At this peroxide concentration a conditioning period of about 1 to 2 hours is sufficient to properly prepare the collagen for the next step of acidification.

A wide range of peroxide concentrations are acceptable. However, if dilute hydrogen peroxide is used, below 0.5%, conditioning time is unduly extended. If very high concentrations, as those exceeding 10%, are employed damage to equipment may occur due to the corrosive action of concentrated hydrogen peroxide upon metals. Therefore a commercially practical range of hydrogen peroxide concentrations will be about 0.6 to 10%. The operable range goes beyond these limits. If suitable non-corrosive equipment is used higher concentrations of peroxide may be safely employed.

In addition to the rapidity of its conditioning action hydrogen peroxide has the further advantage in this process of correcting contamination of collagenous material because of its bacteriocidal properties. In view of the fact that most water dispersible collagen is destined for food purposes this is an important secondary consideration.

Following hydrogen peroxide conditioning the collagen is acidified to pH 3.0 or below. Acidification of the conditioned collagen serves to further condition and soften it in preparation for comminution. We prefer to use hyrochloric acid but other acids may be satisfactorily substituted. Following initial pH adjustment the conditioned material is softened for varying intervals of time depending on the collagen source. Pigskins acidified to pH 2.5–3.0 and maintained at 37° C. for 90 minutes are usually ready for comminution. Cattle hides require a longer acid treatment. Holding hides about 24 to 48 hours at pH 2.5 generally softens them sufficiently so they may be readily ground as by first passing them through a sausage grinder followed by further grinding with a silent cutter.

After the initial acidification softening treatment the collageneous material is comminuted by any suitable method such as a Reitz Disintegrater, Silent Cutter, Cowles Mixer, Baker Perkins Mixer, a Sausage Mill or other comparable equipment.

After comminution the collagen may be dispersed in water by agitation. In the dispersed form it is ready for use as an edible, heat coagulable protein binder, or any other use for which low viscosity collagen is not required. However, it is usually desirable to reduce thickness of the very viscous comminuted collagen.

Collagen paste after comminution will have a total solids content of about 19%. In order to prepare a disperson having 12–15% solids, which is about the optimum solids level for dip-coatings, and which may be poured at room temperature, further heat and or acid treatment is required.

Viscosity reduction may be accomplished by maintaining the comminuted product at a temperature of 50–55° C. for about 5 hours while at pH 3.0. In the alternative, acidity may be adjusted to pH 1–1.5 while the product is maintained at a temperature of about 25° C. for 2 hours. Either treatment yields a product having comparable viscosity. Intermediate and lower pH values and corresponding temperatures may be used with comparable results. Any temperature above 0° C. is operable but reaction times will be somewhat longer; as much as 8 hours may be necessary. In no case should the collagen be subjected to temperatures above 60° C. the operable range may be placed at about 1° to 60° C. In the preferred for of this procedure water is first added to adjust solids content of a water dispersion, and acidity is adjusted to pH 1.0–1.5. The dispersion is agitated at room temperature. The acidified preparation should be agitated continuously, or vigorously at periodic intervals, to hasten dispersion. Under these conditions about 2 hours will be required for proper reduction of viscosity. Periodic addition of acid will serve to control acidity while the collagen is being agitated. After final acidification it is desirable to add suitable alkali to reduce the acidity of the dispersion. At pH 7 the collagen flocculates and may be filtered and washed free of salts.

It is apparent that viscosity reduction of collagen is a function of time, temperature, and pH. Although viscosity is reduced by this procedure solubility is not affected. After lowering of viscosity the collagen still remains water insoluble. Operable pH limits of this step are about pH 4.0 to any points therebelow.

The above stated temperatures, times, and pHs will yield a dispersion which has a pour-point, referring to the percent solids at which the dispersion is liquid and capable of being poured from a container, of about 12% solids at 37° C. Such a dispersion is most suitable for use as a dip-coating. Although much more dilute dispersions may be satisfactorily used it is preferred that dip-coatings contain at least 6% total solids.

It will be realized that the conditioning influence exerted by hydrogen peroxide on collagen is not clearly understood. However, the following explanation serves as a reasonable hypothesis. Native collagen consists of 3 inter-twined helical peptide chains which are cross-bonded to form a 3 dimensional polymer. Hydrogen bonding serves to unite these highly oriented collagen molecules into sets of 3 coiled chains. Hydrogen peroxide may cause a partial rupturing of the hydrogen cross-bonding. This partial rupturing serves to facilitate water dispersion. Maintaining the comminuted collagen at pH values below 4.0 for some period of time, or for shorter periods of time coupled with application of heat up to a temperature of about 60° C., serves to decrease viscosity of collagenous dispersions. This viscosity reduction is attributable to the fact that the oriented bundles of 3 chains which are present in native collagen become largely dis-oriented so that on completion of the process large disorganized bundles having only a few remaining cross linkages remain. These bundles are insoluble in water, precipitate at their isoelectric point, and generally exhibit the properties of collagen.

Gelatin, on the other hand, consists of single peptide fragments having a molecular weight about ⅓ that of native collagen. The oriented, strong insoluble molecules of collagen when converted to gelatin are completely reduced to water soluble randomly coiled small fragments. These fragments consist of single peptide chains. Gelatin is water soluble, not coagulated by heating and does not precipitate at its isoelectric point.

Several additional steps and modifications, in addition to the optional viscosity reduction step, are highly desirable but unessential to the practice of this invention.

We prefer to purify the collagen dispersion when utilizing certain collagenous materials. Purification refers to the procedure for removing non-collagenous and non-dispersible matter from the raw material. For example, removal of hair roots from pig skins is usually desirable. Two methods of purification may be employed: straining a high solids liquified dispersion after viscosity reduction treatment; or water dilution of a thick comminution, plus vigorous or prolonged agitation, followed by filtration. When the collagen product will be associated with foods, as in the case of food dip-coatings and heat coagulable food binders, this purification step is preferable for aesthetic reasons.

Many desirable additives may be added to the prepared collagen liquid prior to its inclusion in, or application to, foods. Smoke and other flavors, colors, mold inhibitors, antioxidants, and other preservatives are examples of desirable additives which may be incorporated into the product of this invention.

We further find that our collagen preparation may be tanned to obtain a desirable product. A film of water dispersible collagen may be contacted by usual tanning agents to yield a very tough film. In addition, color tinting of the collagenous films is possible by selecting proper tanning agents. Any of the usual vegetable, mineral, or synthetic tanning agents may be used for the process of toughening or tinting the product of this invention. Conventional smoking as practiced in cured meats produces a tanning action. Of course, non-toxic tanning compounds should be applied to edible products. Degree of tanning may be adjusted by varying the length of time collagen films are contacted by tanning solutions.

Examples of usable tanning agents are: vegetable—wattle, chestnut tannins, oak bark, quebracho extract, and spruce extracts; mineral—sodium bichromate, chrome sulfate, chrome alum and aluminum sulfate; and synthetic tanning agents—formaldehyde, sulfonic chromates, and phenolic synthetic tans.

This invention is further illustrated by the following specific examples. It is to be understood that my invention is not to be restricted to the details of these examples.

*Example I*

Fresh pig skins substantially free from bristles were washed in warm water to remove grease and dirt from the surface.

To 1,000 grams of washed skins 5,000 cc. of warm water containing 2% or 20 cc. of 30% hydrogen peroxide were added. The lot was allowed to stand for about 1.5 hours for the reaction to reach completion. Thirty cc. of concentrated hydrochloric acid was then added. After thorough mixing the batch was held at 37° C. for 2 hours. The pH at this point was 2.5.

The skins were removed from the treating liquor and non-collagenous tissue scraped from both sides. The skins were then finely ground in a sausage mill. The resultant material was added to water to give a suspension having 12% total solids. Concentrated hydrochloric acid was added to the suspension, to adjust the pH to 1.0 to 1.5. Using mechanical agitation furnished by a high speed electrical mixer the high viscosity dispersion was agitated for 2 hours with periodic addition of acid to control pH. After 2 hours' agitation a reduced viscosity dispersion resulted. This dispersion was liquid at 37° C. and a gel at 25° C. At 15% total solids, it could be poured at temperatures as low as 37° C.

*Example II*

Cattle-hide scrap was washed for several hours in running water to remove salt and dirt.

To 1,000 grams of hide was added 5,000 cc. of warm water containing 2%, 20 cc., of 30% hydrogen peroxide. After standing for 90 minutes at 37° C. there was added 30 cc. of concentrated hydrochloric acid and the batch held at 37° C. for 48 hours. At the end of this time the hides could be readily torn by hand. They were then finely ground by first passing through a sausage grinder followed by a Silent Cutter. Water was stirred into the mass and sufficient concentrated hydrochloric acid added to give pH 1.0. After mechanical agitation for 1½ hours the dispersed collagen was strained through a metal screen to remove the loose hair.

*Example III*

A batch of fresh pigs skins and bacon rinds were washed in running water for several hours. 1,000 grams of the washed skin and rinds were placed in 5,000 cc. of water at 37° C. 20 cc. of 30% hydrogen peroxide were added to the water. The mixture was stirred and allowed to stand for 2 hours. Sufficient hydrochloric acid was added to give pH 2.0. Temperature was maintained at about 25° C. After 2 hours the skins were ground through a sausage mill, suspended in 5 weights of water, and agitated with a high speed mixer which served to disperse the collagen and give a viscous preparation having pH 3.0.

The resulting dispersion was diluted with water to 1% total solids, allowing hair follicles and bristles to settle to the bottom. Purified collagenous liquid was decanted from the top. It was subsequently drained on cloth.

This purified suspension was dried by evaporating in vacuo. The dried collagen thus obtained was readily re-dispersed in water by vigorous agitation.

*Example IV*

1,000 grams of fresh washed pig skins were covered with 5,000 cc. of 37° C. water containing 40 cc. of 30% hydrogen peroxide. After 90 minutes sufficient concentrated hydrochloric acid was added to adjust to pH 3.0. After 2 hours the skins were ground in a sausage mill. The ground material was then placed in 2 parts of water, pH readjusted to 3.0 and the dispersion was heated for 6 hours at 50°–55° C. At the conclusion of the heating period and while the batch was still at 50° C. agitation was employed to further disintegrate the collagen. The resulting liquid was strained through cloth to remove any lumps or hair.

The collagen suspension processed by this procedure had a total solids content of about 12%. This suspension was liquid at 37° C. and a gel at 25° C. There was practically no stickiness in the liquid and none at all in the gel.

Meat pieces were dipped in a liquid dispersion at 37° C. Air drying for a few seconds caused a transparent non-tacky film to form over the pieces.

*Example V*

The use of tanning agents on collagen coatings will result in tougher films.

Pieces of sausage were immersed in a 12% total solids water dispersion of collagen which had been heated and acid process as described in Example IV. The pour-point at 37° C., the total solids content at which a water dispersion will be liquid and pour from a container while at a temperature of 37° C., was 12%–15% total solids. Upon their removal from the dispersion the pieces were air dried 5 minutes. The gel coated sausage was then kept for 1 minute in a solution composed of 15% chromium sulfate, and 85% water, by weight. The resultant coating, having a tough non-tacky surface, was easily stripped from the pieces after complete air drying.

We claim:

1. The process of conditioning water dispersible collagen comprising the steps of contacting collagen with hydrogen peroxide having a concentration of .5 to 10%, acidifying to a pH of about 1.0 to below 3.0, and comminuting the conditioned acidified collagen.

2. The process of preparing a low viscosity collagen comprising the steps of conditioning collagen by contacting it with hydrogen peroxide having a concentration of .5 to 10% to thereby render the collagen more readily water dispersible, adjusting pH of the collagen to about 1.0 to below 3.0, comminuting the acidified conditioned collagen, maintaining the comminuted collagen at a pH of up to 4.0 while at a temperature of from about 1° to 60° C. for a time period sufficient to decrease viscosity of the treated collagen to a level at which a water dispersion has a pour-point above about 6% total solids at a temperature of 37° C.

3. The process of preparing low viscosity collagen comprising the steps of conditioning collagen with hydrogen peroxide having a concentration of .5 to 10%, acidifying the conditioned collagen to a pH of about 1.0 to below 3.0, comminuting the treated collagen, and maintaining the comminuted collagen at a pH of about 1.0 while at a temperature of approximately 37° C.

4. The process of preparing low viscosity water dispersible collagen comprising the steps of conditioning collagen by contacting it with hydrogen peroxide having a concentration of .5 to 10%, acidfying the conditioned collagen to a pH of approximately 3.0, comminuting said conditioned collagen, and heat treating said collagen at a temperature of about 50° C. for about 6 hours.

5. A food product enrobed with the product produced by the process of claim 2.

6. As a new composition of matter hydrogen peroxide conditioned water dispersible collagen in which the normal hydrogen cross-bonding between the three intertwined helical peptide chains thereof are partially ruptured to provide water dispersibility.

7. The process of preparing an edible food coating comprising the steps of conditioning collagen by contacting it with hydrogen peroxide having a concentration of .5 to 10% to thereby render the collagen readily water dispersible, acidifying the collagen to a pH of about 1.0 to below pH 3.0, comminuting said collagen, maintaining said collagen at a temperature of from about 1° to 60° C. and for a period of time sufficient to reduce the viscosity of the collagen, and forming a film with the treated collagen.

8. The process of preparing a food coating comprising the steps of conditioning collagen by contacting it with hydrogen peroxide having a concentration of .5 to 10%, acidifying the conditioned collagen to a pH of about 1.0 but not to exceed 3.0, comminuting the collagen, maintaining said collagen at a temperature of from 1° to 60° C. for a period of time up to 8 hours, and forming a film with the collagen.

References Cited in the file of this patent
UNITED STATES PATENTS

| | | |
|---|---|---|
| 2,649,357 | Happey et al. | Aug. 18, 1953 |
| 2,728,759 | Keil | Dec. 27, 1955 |
| 2,919,999 | Reissman et al. | Jan. 5, 1960 |
| 2,934,446 | Highberger et al. | Apr. 26, 1960 |

FOREIGN PATENTS

| | | |
|---|---|---|
| 429,524 | Great Britain | May 31, 1935 |
| 470,707 | Great Britain | Aug. 19, 1937 |